United States Patent [19]

Aubry et al.

[11] Patent Number: 4,974,794
[45] Date of Patent: Dec. 4, 1990

[54] ELASTIC STRUT HAVING AN INTEGRATED HYDROMECHANICAL RESONATOR IN PARTICULAR FOR THE SUSPENSION OF A TRANSMISSION BOX ON A ROTOR AIRCRAFT AND A SUSPENSION DEVICE USING SUCH A STRUT

[75] Inventors: Jacques A. Aubry, Cabries; Michel Deguise, Mallemort; Victor Y. Yana, Marseilles, all of France

[73] Assignee: Aerospatiale Societe Nationale Industrielle, Paris, France

[21] Appl. No.: 329,752

[22] Filed: Mar. 28, 1989

[30] Foreign Application Priority Data

Mar. 30, 1988 [FR] France ................................ 88 04190

[51] Int. Cl.$^5$ .............................................. B64C 27/00
[52] U.S. Cl. .................................. 244/17.27; 267/136;
267/140.1 R; 267/217
[58] Field of Search ............... 244/17.27, 17.25, 17.17,
244/22; 188/271, 266, 297; 267/140.1 R, 217,
35, 136

[56] References Cited

U.S. PATENT DOCUMENTS 3,920,202 11/1975 Mouille ........................... 244/17.27
4,431,148 2/1984 Mouille ........................... 244/17.27

FOREIGN PATENT DOCUMENTS 1054896 1/1967 United Kingdom ............ 244/17.27

Primary Examiner—Charles T. Jordan
Assistant Examiner—Rochelle Lieberman
Attorney, Agent, or Firm—Martin Smolowitz

[57] ABSTRACT

In this elastic strut incorporating a hydromechanical resonator having a weight/spring system of the type providing a hydraulic amplification of the displacement of the beating weight (7), the weight mounted between two opposed return springs constitutes a double-sided hollow piston slidably mounted on two coaxial opposed cylinders (6) in a closed chamber filled with a liquid (10) in an inner tubular element (1) disposed in an outer tubular element (2) with which it defines, at each end, a chamber (18, 26) filled with liquid onto which opens one of the cylinders (6), the elements (1, 2) constituting the body of the strut being coaxially movable relative to each other and fixed together at each of their ends in a sealed and elastic manner by bearings composed of an elastomer material.

5 Claims, 2 Drawing Sheets

ELASTIC STRUT HAVING AN INTEGRATED HYDROMECHANICAL RESONATOR IN PARTICULAR FOR THE SUSPENSION OF A TRANSMISSION BOX ON A ROTOR AIRCRAFT AND A SUSPENSION DEVICE USING SUCH A STRUT

BACKGROUND OF THE INVENTION

The present invention relates to an elastic strut having an integrated weight/spring type resonator employed in particular, but not exclusively, in bar suspension systems for the main transmission on the structure of the fuselage of rotary wing aircraft for filtering the vibrations produced by the lifting rotor of these aircraft.

These suspension systems are well known and comprise a connection between the main transmission box and the fuselage, constituted by an assembly of rigid bars forming a pylon each of which are connected to the fuselage of the aircraft through an elastic device and, as the case may be, an associated resonator for filtering the longitudinal, lateral and vertical dynamic excitations coming from the head of the rotor.

FR-2 450 200 discloses a suspension device in which rigid elements of the system, or pylon, are connected to the structure of the fuselage by elastic studs of elastomer operating in shear stress, and thereby introducing an axial elasticity characteristic. However, this device does not comprise a resonator element necessary for obtaining a high degree of attenuation of the vibrations between the rotor and the fuselage.

EP-A-0 015 378 discloses an elastic device associated with a resonator including the application of the "liquid lever" principle, i.e. a mechanism in which a liquid of low viscosity acts as a lever on a shaft and a weight connected to a spring. This liquid of low viscosity, contained within a volume which is variable by means of two corrugated metal membranes which seal the system, is put under pressure by a spring. The axial beating weight is in this way put into alternating motion by the variations in the pressure of the liquid which themselves result from provoked variations of the volume of the container of said liquid. The resonator is axially guided by ball bearings.

On one hand, this type of resonator is particularly expensive to manufacture as concerns the metal membranes; on the other hand, it is very difficult to achieve good reliability of these membranes owing to the fact that, in operation, they are subjected to large dynamic stresses and any fatigue crack which occurs therein results in a leakage of liquid and consequently a total loss of the effectiveness of the resonator.

Furthermore, in known resonators, it has been found necessary, in order to limit the size of the weight, to amplify its displacement by mechanical lever systems. The maximum ratio of the amplification thus obtained is limited to about 8 owing to technological requirements.

SUMMARY OF THE INVENTION

An object of the invention is therefore to provide a highly stiff elastic strut incorporating a resonator of simple and consequently cheap construction, and, which is very reliable in operation.

Another object of the invention is to provide the integrated hydromechanical resonator of the "liquid lever" type which provides a markedly higher ratio of the amplification of the displacement of the beating weight, thereby permitting a saving in weight and overall size which are particularly appreciable in rotary wing aircraft.

The invention therefore provides an elastic strut incorporating a hydromechanical resonator having a weight/spring system, of the type providing a hydraulic amplification of the displacement of the beating weight, wherein said weight constitutes a double-sided hollow piston slidably mounted on two coaxially opposed hollow cylinders in a closed chamber filled with a liquid of low viscosity in an inner tubular element disposed in an outer tubular element with which it defines, at each end, a chamber filled with the same liquid of low viscosity onto which one of said cylinders opens, said elements being coaxially movable and elastically biased to a mean position relative to each other.

Advantageously, said tubular elements are interconnected by cylindrical bearings of elastomer material so as, on one hand, to permit them a limited relative displacement with an energetic elastic return to a mean position and, on the other hand, to ensure the sealed closure of the chambers disposed at each end of said tubular elements.

According to another feature of the invention, said weight slidably mounted on said cylinders is elastically biased to an intermediate position inside said chamber.

The following description, with reference to the accompanying drawings given as non-limitative examples, will explain how the invention may be carried out.

DESCRIPTION OF THE PREFERRED EMBODIMENTS

Figure 1:
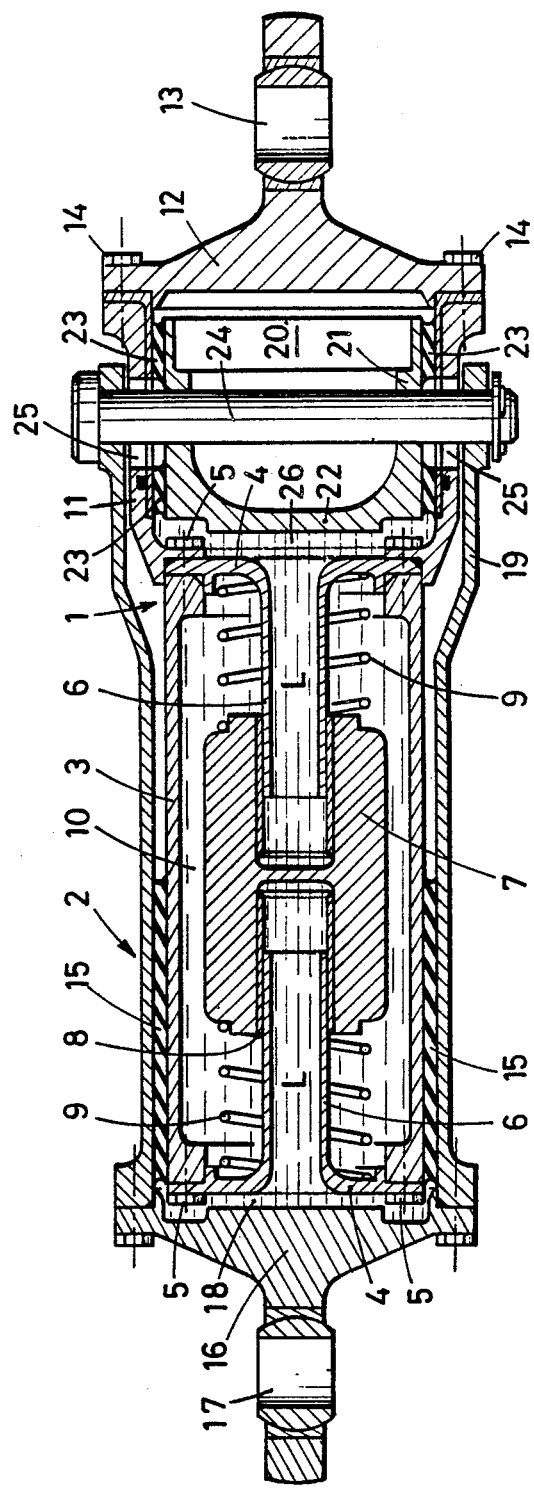
FIG. 1 is a longitudinal sectional view of an elastic strut having an integrated hydromechanical resonator according to the invention.

As shown in FIG. 1, an elastic strut having an integrated hydromechanical resonator according to the invention comprises a first tubular element 1 located coaxially inside a second tubular element 2.

The inner tubular element 1 has a body 3 which may be cylindrical and open at both ends, each of the latter being closed by a member 4 fixed by screws 5 and including at its centre a tubular boss 6 which extends axially inwardly so that the two tubular bosses are in alignment. The tubular boss their lengths are equal and each less than one half of the length of the body 3 so as to leave a free space between their ends.

A weight 7 of heavy metal, for example of inermel, having the shape of an elongated solid of revolution and including two axially aligned blind apertures opening in opposite directions onto the end faces of the weight, is slidably mounted with a slight clearance on the bosses 6 and around the latter by means of friction rings 8.

The slidable weight 7 is maintained in an intermediate position by two opposed coil springs 9 each disposed around a boss 6 between the member 4 and the weight and, it will be understood that, in order to slide freely in the chamber defined by the tubular element 1, the diameter of weight 7 must be less than that of the tubular element 1. This chamber is filled with a fluid 10 having a low viscosity.

The assembly arranged in this way is completed by an element 11 having a diameter slightly larger than that of the element 1, and constituting a skirt which is fixed to one of the ends of the latter on top of the member 4 by screws 5 which also fix the member 4.

It will be understood that the inner space of the skirt 11 communicates with the corresponding tubular boss 6. The end of the skirt 11 remote from the member 4 is provided with a cap 12 defining a fixing eye 13 and fixed to the skirt by screws 14.

As mentioned hereinbefore, the assembly constituted by the tubular element 1 is disposed inside the outer tubular element 2 to which it is fixed by a cylindrical bearing 15 composed of an elastomer in the vicinity of one end, the arrangement being such that the ends on the same side of the elements 1, 2 are roughly flush. The end of the element 2 is closed by a cap 16 similiar to the cap 12 of the skirt 11, provided with a fixing eye 17 and so adapted as to define a space 18 with the member 4 of the element 1, which space communicates with the tubular boss 6 and thereby forms a chamber closed by the weight 7 and the bearing 15 and filled with a liquid L.

At its opposite end, the body of the element 2 comprises a portion of enlarged diameter forming a bell 19, which surrounds a part of the skirt 11 and is connected to the latter indirectly, as will be described.

A connecting member 20 is disposed inside the skirt 11 and comprises a peripheral wall 21 which has an outer shape corresponding to the inner shape of the skirt and is closed by a transverse wall 22.

The member 20 is fixed, on one hand, to the inner surface of the skirt 11 by a bearing 23 composed of an elastomer and, on the other hand, is fixed to the bell 19 by a pin 24 which extends transversely of the latter, the skirt 11 and the connecting member 20, without clearance in corresponding diametrically opposed apertures provided in the bell 19 and the wall 21 of the member 20, and with a clearance through diametrically opposed elongated openings 25 provided in the skirt 11.

The transverse wall 22 of the connecting member 20 is in facing relation to the member 4 of the element 1, thereby defining with this member 4 a space 26 communicating with the tubular boss 6 and thus forming a chamber closed by the weight 7 and the bearing 23, and filled with a liquid L identical to that filling the chamber 18.

Owing to this arrangement and the bearings 15 and 23 of elastomer, the elements 1 and 2 are capable of slightly axially moving relative to each other within limits determined by the elastomer of the bearings, these relative movements being limited in a positive manner by the abutment of the end of the element 1 against the cap 16 of the element 2, on one hand, and the abutment of the pin 24 against the ends of the elongated openings 25, on the other hand.

When the inner element 1 moves, for example to the left as viewed in FIG. 1, under the action of a force applied between the eyes 13 and 17, the space 18 is reduced in size and the liquid L is expelled into the tubular boss 6.

The weight 7 forms a piston which is biased by the pressure of the liquid in opposition to the action of the opposed spring 9 in sliding on the cylinders constituted by the bosses 6 through a distance which is greater than the relative displacement of the elements 1 and 2, owing to the difference between the area of the member 4 and the section of the boss 6. Simultaneously, the weight 7 forming a piston also on the other boss 6, displaces an equivalent volume of liquid L in the chamber 26.

If the force applied between the eyes 13 and 17 is eliminated, the elastomer bearings 15 and 23 return the elements 1 and 2 to the mean position, and simultaneously the spring 9 which was compressed biases the weight-piston 7 to its intermediate position.

In dynamic operation, the adjustment of the friction rings 8 in the weight 7 on the bosses 6 is such that the leakage of liquid of low viscosity may be considered as negligible and moreover compensated for in each alternating movement by the effect of symmetry. On the other hand, the static displacement of the weight 7 is permitted by this possibility of a slight leakage.

Figure 2:
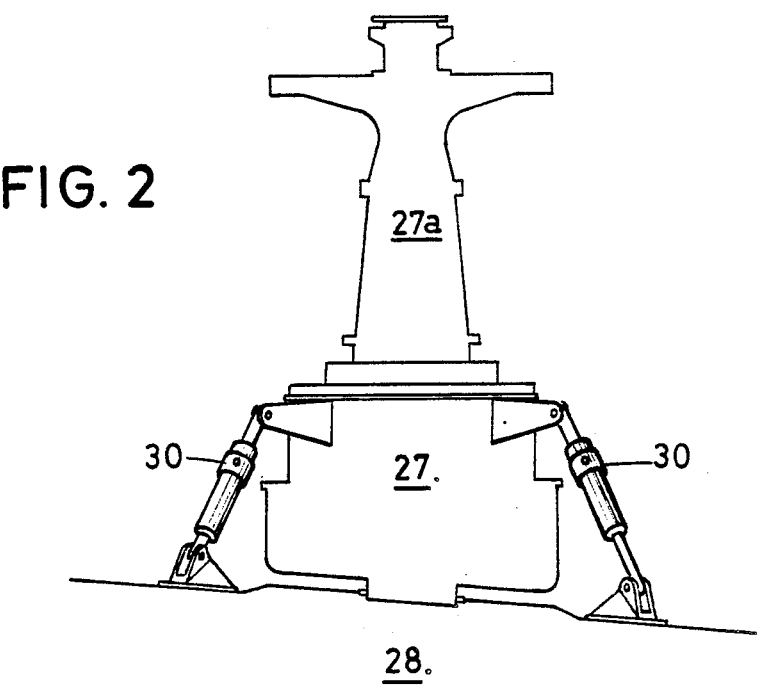
FIG. 2 is a side elevational view of an example of the application of elastic struts having an integrated resonator according to the invention in the fixing of the transmission box on the fuselage of a helicopter so as to ensure also the filtering and the attenuation of the vibrations coming from the rotor.
Figure 3:
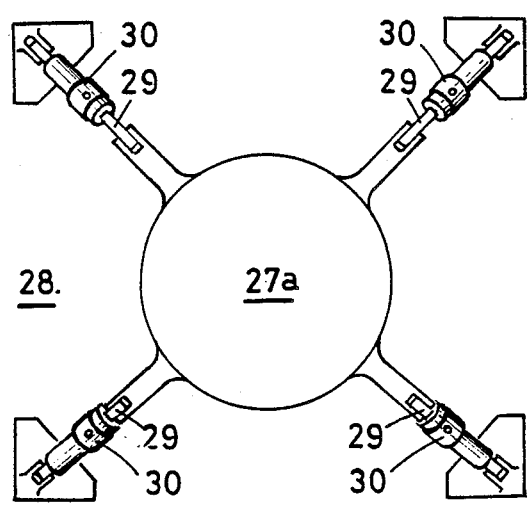
FIG. 3 is a top plan view showing use of four elastic struts attached to the transmission box of a helicopter.

FIGS. 2 and 3 show an example of an advantageous application of the resonator according to the invention.

The main transmission box 27 of a helicopter is fixed to the fuselage 28 of the latter, surmounted by a shaft 27a equipped with a hub in the known manner, the bottom of this box being also connected to the fuselage, for example by means of a membrane which is rigid in its own plane and flexible in the direction perpendicular to this plane, as described in the U.S. Pat. No. 4,431,148.

In this device having a focal point, there are provided four bars 29 concurrent at the oscillation point of the box, and a radial arm having a flexible portion and a beating weight fixed to the end of a rigid lever connected to the radial arm.

In a particularly advantageous manner, each bar 29 is formed by a strut 30 having an integrated hydromechanical resonator according to the invention, which resonator replaces in this application both the radial arm and the beating weight.

The axial static forces in the strut 30 deform the elastic bearings 15 and 23 but do not cause corresponding static displacements of the weight 7 owing to the slight leakages allowed between the friction rings 8 in the weight 7 on the bosses 6 and the action of the return springs 9 on the weight 7. Consequently, the effective travel of the weight 7 to be provided for is solely dynamic, which reduces the overall size of the resonator device.

The resonator according to the invention permits obtaining within a reduced space large ratios of amplification of the movement of the beating weight, attaining twice the largest ratio obtained with conventional arrangements, which consequently permits a very large reduction in the beating weight, in a ratio which is substantially inversely proportional to the square of the amplification ratio.

Furthermore, as the resonator device has no sliding sealing elements which create friction and therefore unwanted dampings, there is no impairment of the antivibratory performances introduced by the dampings proper inside the resonator.

The absence of sliding sealing elements and wear members is a guarantee of high reliability of the device according to the invention.

What is claimed is:

1. An elastic strut incorporating a hydromechanical resonator having a weight/spring system providing a hydraulic amplification of a displacement of a beating weight, said strut comprising:

a body constituted by an inner tubular element (1) and an outer tubular element (2) which is coaxial with the inner tubular element;

two hydraulic chambers respectively disposed inside ends of said tubular elements;

two cylindrical bearings composed of an elastomer material for interconnecting in a sealed and elastic manner ends of the two tubular elements so as to permit the two tubular elements, under the effect of axial forces, limited relative displacements with an elastic return to a mean position and to ensure a sealed closure of said two hydraulic chambers;

a liquid having a low viscosity filling said two chambers;

a beating weight; two opposed springs cooperative with said beating weight for biasing said weight to a neutral position, said beating weight constituting a double-sided hollow piston;

a third closed hydraulic chamber constituted inside the inner tubular element (1) and filled with said liquid having a low viscosity;

two coaxially opposed hollow cylinders in said third closed hydraulic chamber, said piston being slidably mounted on said two hollow cylinders, said two hollow cylinders each opening onto a respective one of said hydraulic chambers disposed at respective ends of said tubular elements.

2. An elastic strut according to claim 1, comprising closing members for closing ends of said inner element, said cylinders being tubular bosses connected to said closing members and extending inside said inner element, said piston being biased to said neutral position by said two springs which are disposed around said tubular bosses on opposite sides of said piston.

3. An elastic strut according to claim 1, wherein each of said hydraulic chambers comprises end walls of different areas, the end walls having the largest areas being outer walls and the end walls having the smallest areas being constituted by said double piston.

4. An elastic strut according to claim 3, wherein each of said inner and outer elements comprises outer fixing means for introducing axial forces.

5. A suspension device comprising bars for a main transmission box on a structure of a fuselage of a rotor aircraft, wherein each of said bars comprises an elastic strut incorporating a hydromechanical resonator having a weight/spring system providing a hydraulic amplification of a displacement of a beating weight, said strut comprising a body constituted by an inner tubular element (1) and an outer tubular element (2) which is coaxial with the inner tubular element;

two hydraulic chamber respectively disposed inside ends of said tubular elements;

two cylindrical bearings composed of an elastomer material for interconnecting in a sealed and elastic manner ends of the two tubular elements so as to permit the two tubular elements, under the effect of axial forces, limited relative displacements with an elastic return to a mean position and to ensure a sealed closure of said two hydraulic chambers;

a liquid having a low viscosity filling said two chambers;

a beating weight; to opposed springs cooperative with said beating weight for biasing said weight to a neutral position, said beating weight constituting a double-sided hollow piston;

a third closed hydraulic chamber constituted inside the inner tubular element (1) and filled with said liquid having a low viscosity, two coaxially opposed hollow cylinders in said third closed hydraulic chamber, said piston being slidably mounted on said two hollow cylinders, said two hollow cylinders each opening onto a respective one of said hydraulic chambers disposed at respective ends of said tubular elements.

* * * * *